(No Model.)  2 Sheets—Sheet 1.
W. W. CLOCK.
COTTON PLANTER.
No. 456,138. Patented July 21, 1891.
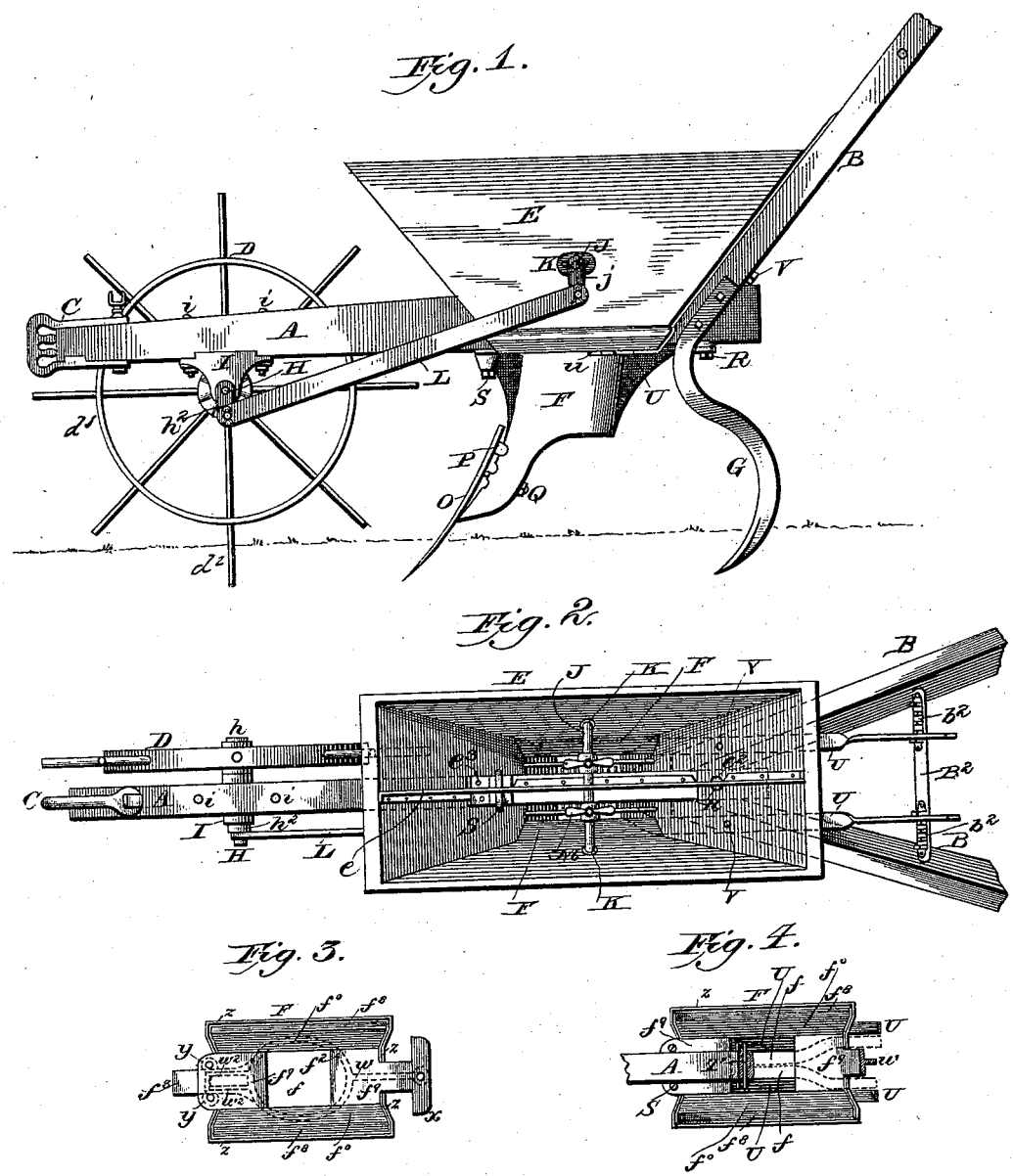
WITNESSES
F. L. Ourand
Geo. W. Whitney
INVENTOR
Willard Ward Clock,
Attorney (No Model.) 2 Sheets—Sheet 2.
W. W. CLOCK.
COTTON PLANTER.
No. 456,138. Patented July 21, 1891.
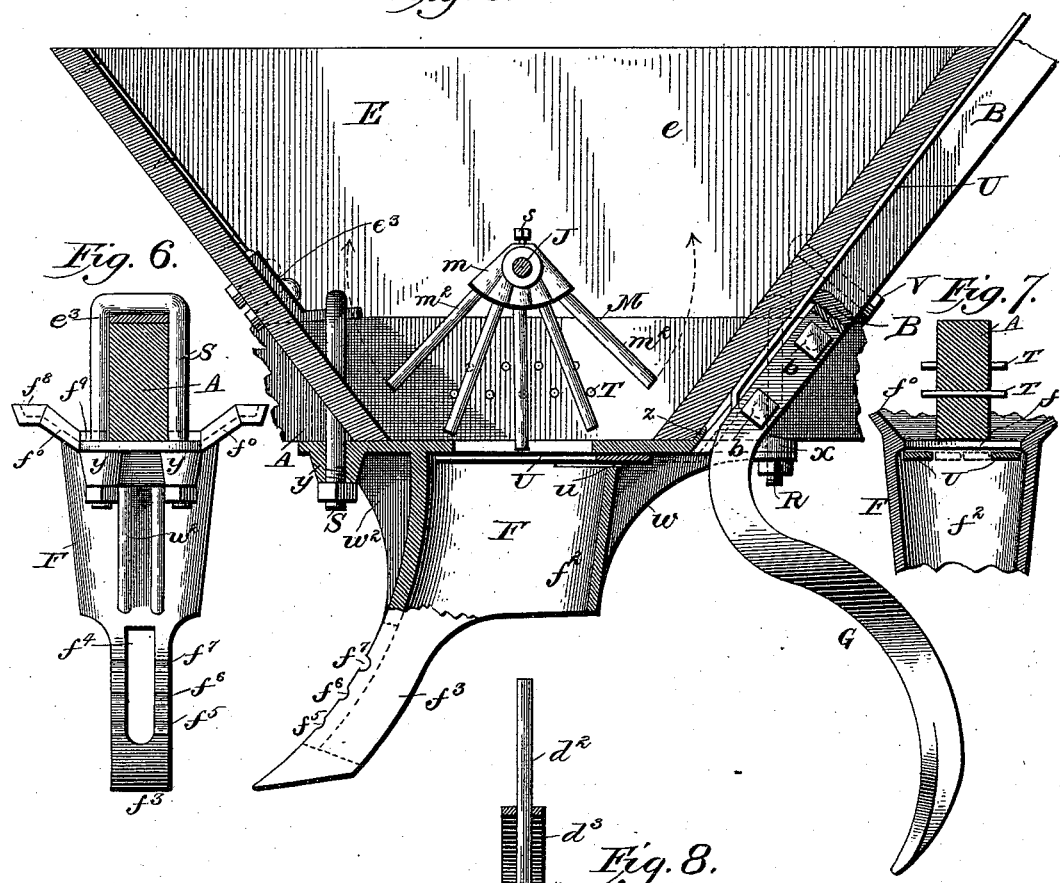
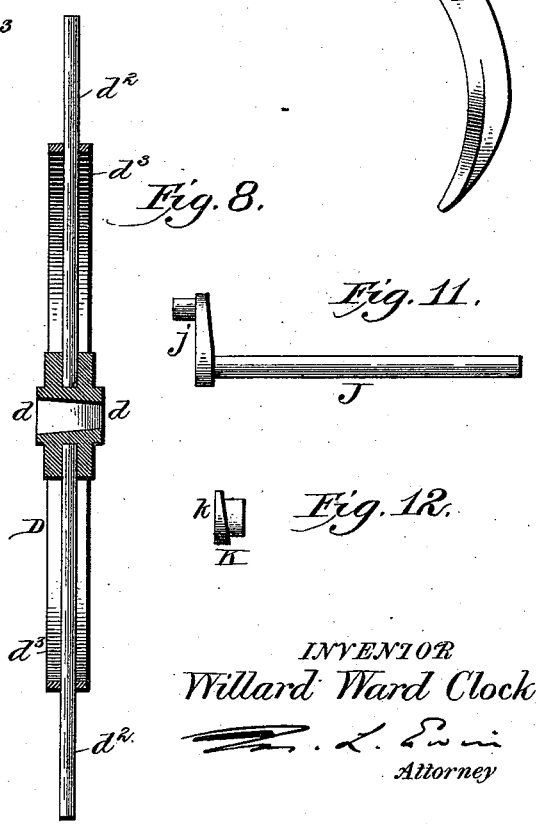
WITNESSES
F. L. Ourand
Geo. W. Whitney
INVENTOR
Willard Ward Clock,
Attorney
THE NORRIS PETERS CO., PHOTO-LITHO., WASHINGTON, D. C.

UNITED STATES PATENT OFFICE.

WILLARD W. CLOCK, OF ISLIP, NEW YORK.

COTTON-PLANTER.

SPECIFICATION forming part of Letters Patent No. 456,138, dated July 21, 1891.

Application filed November 22, 1890. Serial No. 372,308. (No model.)

*To all whom it may concern:*

Be it known that I, WILLARD WARD CLOCK, a citizen of the United States, and a resident of Islip, (Long Island,) in the State of New York, have invented a new and useful Improvement in Cotton-Planters, of which the following is a specification.

This invention relates to those cotton-planters in which the cotton-seed and a suitable fertilizer are dropped simultaneously from adjoining hoppers or hopper-compartments, and in which the working parts are combined with a beam and handles similar to those of an ordinary plow.

The present invention consists in certain novel combinations of peculiarly-constructed parts, as hereinafter set forth and claimed.

The objects of the invention are, first, to unite a double hopper and a plow-point common to both compartments thereof with each other and with the beam by means of a novel foot adapted to be readily cast so as to possess great strength and rigidity without excessive weight; secondly, to provide by means of said foot and simple accessories for adjusting the plow-point to plow to given depths in different kinds of soil; thirdly, to adapt the said foot to support the sides and ends of the double hopper in an effective manner; fourthly, to adapt the same to support the rear covering-feet in the direction of greatest strain; fifthly, to provide for strongly and securely uniting the double hopper and foot with each other and with the beam by devices which serve to strengthen the beam rather than to weaken it, and which are of the utmost simplicity; sixthly, to prevent any leakage of the fertilizer between the hopper and foot by means which serve also to stiffen the hopper; seventhly, to provide for dropping rolled or damp seed with as much certainty as dry seed; eighthly, to regulate the discharge of seed or fertilizer at will in a simple and effective manner and so that the feed-opening can be instantly closed, opened, or regulated for any desired feed without stopping the planter; and, ninthly, to provide for controlling and regulating the feed from both compartments of the hopper in like manner. The planter as a whole is, furthermore, of novel construction with reference to efficiency, cheapness, and great strength.

Two sheets of drawings accompany this specification as part thereof.

Figure 1 of the drawings is a side elevation of the improved planter. Fig. 2 is a top view of the same. Fig. 3 is a top view of its said "foot" detached. Fig. 4 is a supplemental top view of the foot with a fragment of the beam and the front ends of the feed-regulators added, illustrating by full and dotted lines the operation of the latter. Fig. 5 is a fragmentary side view, partly in vertical section. Fig. 6 is a fragmentary front view of the foot and its front fastening. Fig. 7 is a fragmentary vertical cross-section, further illustrating the operation of the feed-regulators. Fig. 8 is a diametrical section of the prong-wheel. Fig. 9 is an elevation of the shaft of said wheel. Fig. 10 is a perspective view of the bearing of said shaft. Fig. 11 is an elevation of the crank-shaft of the agitators; and Fig. 12 is an elevation of one of the bearings of said crank-shaft, Figs. 5 to 12, inclusive, being enlarged one diameter from Figs. 1 to 4.

Like letters of reference indicate corresponding parts in the several figures.

To an ordinary plow-beam A, having a pair of ordinary handles B at its rear end and a suitable clevis C at its front end, I attach near its front end the bearing of a prong-wheel D, and near its rear end or immediately in front of the handles I attach a double hopper E, located mainly above the beam, a subjacent foot F, located mainly below the beam, and a pair of covering-feet G, which project rearwardly and downwardly from the lower ends of the handles, and are attached therewith to the beam A by one and the same pair of through bolts $b$, Fig. 5. Said prong-wheel D, (shown detached in Fig. 8,) is composed of a hub $d$, of cast-iron, radial rod-iron prongs $d^2$, secured at their inner ends in said hub, and a bar-iron stop-ring $d^3$, through which the several prongs protrude to a distance of four inches more or less. The prongs enter the soil, as indicated in Fig. 1, to the depth determined by the stop-ring $d^3$, and by keeping the protruding ends of the prongs fully sunk the wheel can be made to rotate without lost motion and at standard speed in any kind of soil. The wheel has a short crank-axle H, (shown detached in Fig. 9,) constructed with a square portion $h$ and a crank-arm $h^2$ at its respective ends, and its bearing I, (shown detached in Fig. 10,) is adapted to be and is securely attached to the under side of the beam A by vertical bolts $i$, and locates the prong-wheel D, the hub of which is fitted to said square portion $h$ on the right-hand side of the beam, for example, and said crank-arm $h^2$ on the other side of the beam, as shown in Fig. 2.

A horizontal rock-shaft J (shown detached in Fig. 11) is mounted in a pair of bearings K, one of which is shown detached in Fig. 12, so as to extend across the hopper E at mid-length and at a suitable height, said bearings K being let into the respective sides of the hopper, as indicated in Fig. 2. The outer ends $k$, Fig. 12, are vertical, and a crank-arm $j$ on the left-hand end of the rock-shaft works adjacent to the left-hand bearing outside of the hopper, and is connected by a rod L, Figs. 1 and 2, with said crank-arm $h^2$ of the prong-wheel shaft H. The radius of said crank-arm $j$ is greater than that of said crank-arm $h^2$, and the rotation of the prong-wheel D is consequently converted into a pendulous vibration of a pair of agitators M, carried by said rock-shaft J within the respective compartments of the hopper E. These agitators are of a fan shape, and are each composed of a cast-iron hub $m$, Fig. 5, fitted to the rock-shaft J, and five, or, it may be, more or less, fingers $m^2$, secured at their upper ends within said hub and depending therefrom within about one-third of a circle. A set-screw $s$, Fig. 5, tapped into the top of each hub $m$, provides for fastening the agitators on the rock-shaft in effective positions. The vibrating motion of the agitators M is represented in Fig. 5 by dotted arrows. The ends and sides of the double hopper E are conveniently made of wood and converge downward to the top of the foot F, to which their lower edges are fitted. The hopper is divided into two equal compartments by a central longitudinal partition $e$, Figs. 2 and 5, preferably of sheet metal, extending downward to the top of the beam and by the beam itself below this point. A central feed-opening $f$, Figs. 3, 4, 5, and 7, and an ample delivery-spout $f^2$, leading downward therefrom, are common to both compartments of the hopper E and are formed within the foot F, as shown in the figures last referred to. A suitable plow-point O, Fig. 1, attached to the front of the foot F, is also common to both compartments of the hopper.

For readily adjusting the plow-point to plow to given depths in different kinds of soil the single central toe $f^3$, in which the foot F terminates at bottom, is constructed with a longitudinal slot $f^4$, Figs. 5 and 6, perpendicular to its front and with a series of transverse notches $f^5 f^6 f^7$, of different depths, in the front of the toe, crossing said slot $f^4$ at different heights. A half-round adjusting-pin P, Fig. 1, movable independently of the point O, is fitted, as regards its convex back, to said notches, and a screw-bolt Q extends rearward through the plow-point O and occupies the said slot $f^4$ in the foot. The notches $f^5 f^6 f^7$ are of different depths, as seen in Fig. 5, and by placing the pin P in one or the other of them, or omitting the pin altogether and adjusting the bolt Q vertically within the slot $f^4$, the plow-point may be so set as to penetrate to any required depth in different soils.

The top of the foot F (exposed to view in Fig. 3 and partly in Fig. 4) has horizontal lateral edges $f^8$ and a horizontal central portion $f^9$ of greater width than the beam, which afford substantial supports for the wooden sides and ends of the double hopper E. In the plane of said horizontal portion $f^9$ the rear end of the foot is T-shaped and terminates in a cross-bar $x$, which is let into the beam at bottom, as shown in Figs. 1 and 5, and serves, as represented in these figures, to support the covering-feet G from behind in an effective manner. A vertical screw-bolt R, Fig. 5, having its head at its upper end, extends downward from a head-seat $e^2$ in the rear end of the hopper E, through a sufficient depth of said end for a strong hold, thence through the beam A, and finally through said cross-bar $x$ of the foot F and a central boss beneath said cross-bar, below which the nut of the bolt is applied. Above the front end of the foot the hopper E has the rear end of an angle-brace $e^3$ securely bolted to its front end at the intersection of the latter with the top of the beam A, and a staple S, having screw-threaded ends at bottom, straddles the rear end of said angle-brace and the beam A, and its respective ends extend downward through depending bosses $y$ at the front end of the top of the foot F, and receive a pair of screw-nuts below said bosses. The hopper E and foot F are thus strongly and securely united with each other and with the beam A by means which strengthen the beam instead of weakening it, and which involve tightening only three screw-nuts to fasten the whole. A central vertical web $w$, Fig. 5, at rear, and a pair of such webs $w^2$, Figs. 5 and 6, in front, substantially in line with said bolt R and with the respective ends of said staple S, brace and stiffen the foot.

Either side of the double hopper E may be used for the fertilizer, any leakage of which at the joints between the hopper and the foot is effectively prevented by a marginal flange $z$ on the top of the foot, which embraces the sides and ends of the hopper, and serves, also, to stiffen the latter. The said horizontal lateral edges $f^8$ of the foot F are elevated relatively to said horizontal portion $f^9$, as seen in Fig. 6, and are connected therewith by bevels $f^0$, which tend to direct the seed and fertilizer laterally inward toward the sides of the beam A within the respective compartments of the hopper E. The converging sides of the hopper have the same effect on the contents of the hopper. The seed and fertilizer are thus caused to press laterally into the vertical planes of the agitators M, and at the same time against what I term "feed-prongs," formed by the protruding ends of a number of pins T, held in transverse holes in the beam, and preferably arranged, as shown in Figs. 5 and 7, so that their ends or "prongs" are in two horizontal ranks, with alternating spaces. By the coaction of these prongs with fan-shaped agitators M, constructed as above, rolled or damp seed may be planted with as much certainty as dry seed, and lumps in the fertilizer are effectively broken up.

For controlling or regulating the discharge of the seed and fertilizer, the front ends of a pair of lever-shaped "regulators" U project through slots $u$ in the back of the foot F at top to a short distance beyond the front line of the feed-opening $f$, as best seen in Figs. 4 and 5. A pair of screw-bolts V form pivots for these regulators and serve at the same time to attach the handles B to the back of the hopper E. The regulators extend upward beyond their pivots to a cross-round $B^2$ of the handles, which is provided with a toothed rack or racks $b^2$, Fig. 2, with the several notches, in which the upper ends of the respective regulators are adapted to interlock in their different positions. The regulators may thus be fastened in the position in which they are shown in Fig. 2 and in full lines in Figs. 4 and 7, or so that their front ends will be wholly beneath the beam A, as represented in dotted lines in Figs. 4 and 7, or in any desired number of intermediate positions. Starting with both sides of the feed-opening closed, as in full lines in Figs. 4 and 7, by the front ends of the regulators U, the operator shifts the respective regulators so as to adjust each to any desired extent independently of the other, and may readjust them at will or stop the feed from either or both of the compartments without regard to the motion of the planter, and with the utmost facility.

Details which have not been specified may be of any approved description, and I do not limit my respective claims as to mechanical details, except as therein specifically stated.

Having thus described the said cotton-planter, I claim as my invention and desire to patent under this specification—

1. The combination, in a cotton-planter, of a plow beam and handles, a double hopper located immediately in front of the handles and mainly above the beam and having a central longitudinal partition extending downward to the top of the beam, a subjacent cast-iron foot below the beam having a feed-opening and a delivery-spout common to both compartments of the hopper, and a central plow-point attached to the front of said foot, substantially as hereinbefore specified.

2. The combination of the plow-point O, half-round adjusting-pin P, screw-bolt Q, and foot F, the latter having the slot $f^4$ perpendicular to its front and provided in front with the series of transverse notches $f^5$ $f^6$ $f^7$ fitted of different depths to the convex back of said pin, substantially as hereinbefore specified.

3. The foot F, having the horizontal lateral edges $f^8$ and central portion $f^9$, in combination with the overlying beam A of less width than said horizontal portion $f^9$, and the hopper E, having converging wooden sides and ends, the lower edges of which are supported by said lateral edges and central portion, respectively, substantially as hereinbefore specified.

4. The combination, with the beam A and hopper E, of the subjacent foot F, having the cross-bar $x$ immediately below the beam at the rear end of the foot, and the covering-feet G, bolted to the sides of the beam immediately behind the hopper and supported behind by the ends of said cross-bar, substantially as hereinbefore specified.

5. The combination, with the beam A, of the hopper E, having converging ends provided, respectively, with the head-seat $e^2$ and angle-brace $e^3$, the subjacent foot F, having a central vertical bolt-hole at its rear end and a pair of such holes at its front end, the single central screw-bolt R at rear, and the staple S, having screw-threaded lower ends provided with nuts at the front of the foot, substantially as hereinbefore specified.

6. The combination of the double hopper E, having converging sides and ends, and the foot F, having horizontal lateral edges $f^8$, a central horizontal portion $f^9$, and connecting inclines $f^0$, against which the lower edges of said sides and ends of the hopper abut, and which are provided with upright marginal flanges $z$ to embrace said lower edges of the hopper, substantially as hereinbefore specified.

7. The beam A, provided with transverse feed-prong pins T, in combination with the hopper E, having converging sides, the fan-shaped agitators M, arranged to vibrate adjacent to the ends of said pins, and means for actuating said agitators, substantially as hereinbefore specified.

8. A lever-shaped feed-regulator U, having a straight horizontal front end, an upwardly-extended portion, and a suitable upper end, substantially as shown, in combination with a pivot-bolt V, passing through said upwardly-extended portion, a draft-beam A, beneath which the front end of the regulator is movable laterally, a suitable hopper E and a subjacent delivery-foot F, carried by said beam and communicating with each other by means of a feed-opening $f$, crossed by said front end of the regulator, and handles B, having a cross-round provided with a rack $b^2$, with which said upper end of said feed-regulator interlocks, substantially as hereinbefore specified.

9. The combination, with the beam A and double hopper E, of the subjacent foot F, having a feed-opening $f$ and delivery-spout $f^2$ common to both compartments of the hopper and lateral slots $u$ at top, the lever-shaped feed-regulators U, having straight horizontal front ends which project forward through said lateral slots and are adapted to lie side by side beneath the beam when both sides of the feed-opening are fully opened, and are movable laterally to close the respective sides of said opening more or less, the handles B, having a cross-round $B^2$, provided with a rack or racks $b^2$ to interlock with the upper ends of said regulators, and the bolts V, which attach said handles to the back of the hopper and pivot the regulators, substantially as hereinbefore specified.

W. W. CLOCK.

Witnesses:
   HERBERT W. SMITH,
   ELLIOTT J. SMITH.